United States Patent
Camblor Fernandez et al.

(10) Patent No.: US 6,409,986 B1
(45) Date of Patent: Jun. 25, 2002

(54) ZEOLITE ITQ-5

(75) Inventors: Miguel-Angel Camblor Fernandez; Avelino Corma Canos; Susana Valencia Valencia, all of Valencia (ES)

(73) Assignee: Consejo Superior de Investigaciones Cientificas Universidad Politecnica de Valencia

( * ) Notice: Subject to any disclaimer, the term of this patent is extended or adjusted under 35 U.S.C. 154(b) by 0 days.

(21) Appl. No.: 09/581,877

(22) PCT Filed: Dec. 18, 1998

(86) PCT No.: PCT/ES98/00347

§ 371 (c)(1),
(2), (4) Date: Jun. 19, 2000

(87) PCT Pub. No.: WO99/32405

PCT Pub. Date: Jul. 1, 1999

(30) Foreign Application Priority Data

Dec. 19, 1997 (ES) ................................................. 9702696

(51) Int. Cl.[7] .......................... C01B 39/48; C07C 2/58; C10G 11/00; C10G 35/06
(52) U.S. Cl. ..................... 423/705; 423/713; 423/718; 423/DIG. 27; 585/467; 585/722; 208/109; 208/135; 208/120.01
(58) Field of Search .................. 423/705, 713, 423/718, DIG. 27; 585/467, 722; 208/135, 109, 120.01

(56) References Cited

U.S. PATENT DOCUMENTS

| RE28,341 E | | 2/1975 | Wadlinger et al. |
| 4,826,667 A | * | 5/1989 | Zones et al. ................. 423/718 |
| 5,171,556 A | * | 12/1992 | Caullet et al. ............... 423/718 |
| 5,589,153 A | * | 12/1996 | Garces et al. ......... 423/DIG. 27 |
| 5,591,421 A | * | 1/1997 | Zones ......................... 423/718 |

FOREIGN PATENT DOCUMENTS

| EP | 353915 | 2/1990 |
| ES | 2037596 | 6/1993 |
| WO | 9724286 | 7/1997 |

OTHER PUBLICATIONS

Newsam et al., Proc. R. Soc. Land A, (1998), 420: 375 (No Month).

* cited by examiner

Primary Examiner—David Sample
(74) Attorney, Agent, or Firm—Klauber & Jackson

(57) ABSTRACT

The present invention relates to zeolithic materials having a characteristic X ray diffraction pattern, and its preparation method, characterized by the relatively low pH of the synthesis medium and the use of $F^-$ anions as mineralizing agent. The invention also claims the use of the obtained material in catalytic processes for the transformation of hydrocarbons and in oxidation process. The method comprises heating at 363–473° K a reaction mixture which contains a source of at least one tetravalent element T(IV), optionally a source of an element T(III), optionally $H_2O_2$, a structure director organic cation, a source of anions $F^-$ and water, the presence of alkaline cations is not necessary.

21 Claims, 3 Drawing Sheets

ZEOLITE ITQ-5

FIELD OF THE ART

Micro-porous crystalline materials

STATE OF THE ART

Zeolites are micro-porous crystalline materials of variable composition characterised by a crystalline network of $TO_4$ tetrahedrons (where T normally represents Si and Al, but it can also represent Ti, Ge, B, Ga, . . . ) that share all their vertices giving rise to a three-dimensional structure that contains channels and/or cavities of molecular, dimensions. When some of the T atoms are present in an oxidation state less than +4, the crystalline network formed is negatively charged. This charge is compensated for by the presence of organic or inorganic cations in the channels or cavities, organic molecules, salts and $H_2O$ can also occupy these channels and cavities. Thus, in general terms, the chemical composition of the zeolites can be represented by the following empirical formula:

$$X(M_{1/2}XO_2):YYO_2:zR:wH_2O$$

where M is one or several organic or inorganic cations with a +n charge; X is one or several trivalent elements; Y is one or several tetravalent elements; and R is one or several organic substances or a salt. Although the nature of M, X, Y and R and the values of x, y, z and w can, in general, be changed by post-synthesis treatments, the chemical composition of a zeolite material (as it is synthesised or after roasting) has a range that is characteristic of each zeolite and of their method of production.

On the other hand, a zeolite material is also characterised by its crystalline structure that defines its channel and cavity system and gives rise to a specific X-ray diffraction pattern. Thus, zeolites can be differentiated from each other by their chemical composition range and their X-ray diffraction pattern. The intensity of the diffraction lines, with suitable reference to a standard sample, can be used as an indication of the "crystallinity". This concept can refer both to the quantity of material of a crystalline phase in a solid that also contains other phases (for example, an amorphous solid) or to the structural "perfection" of the solid. Both the more or less perfect crystalline structure and the chemical structure also determine the physico-chemical properties of each zeolite or zeotype and their applicability in different industrial processes. Other characteristics of the zeolite that can have a large influence on its applicability include the crystal size and the presence of reticular flaws. Both these properties and the chemical composition of the material can be highly dependent on the preparation method and/or posterior treatments.

The Beta zeolite (U.S. Pat No. 28,341) is a micro-porous crystalline material characterised by its crystalline structure, which gives rise to a specific X-ray diffraction pattern and a unique system of channels, and by its chemical composition, which can be represented by the empirical formula $$[xNa,(1-x)TEA]AlO_2.ySiO_2.wH_2O$$

where x<1, y=5–100, w is up to around 4 and TEA represents the tetraethylammonium cation. In general, the Beta zeolite is synthesised in the presence of alkali cations and the crystalline product normally shows a crystal size between 0.1 and 1 µm. For the zeolite to attain its adsorption properties it is necessary to roast the material synthesised to decompose the tetraethylammonium cation and free the empty intrazeolite volume. Typically, this roasting process is accompanied by a large loss in crystallinity and a de-aluminising effect. The loss of crystallinity may be due to a partial process making the material more amorphous, leading to a loss of the specific properties of the zeolite in catalytic processes. It can also be due to a large increase in the concentration of reticular defects (Si—OH type), which affects the physico-chemical properties of the material and its stability in subsequent thermal processes (such as those that require regeneration of the catalyst in various processes of hydrocarbon transformation, such as catalytic hydrocarbon cracking). The de-aluminising process involves the loss of Al from the network, and therefore the loss of the corresponding Bronsted acid centres, giving rise to Aluminium species outside the network. These species can be very varied and this may have important consequences for the activity of the material. If the synthesis is carried out in the presence of alkali cations it is necessary to effect a cation exchange to obtain the acid form active in catalytic processes that transform hydrocarbons.

An zeotype isomorphous with the Beta zeolite can also be synthesised using Ti atoms in the network, in accordance with the Spanish patent 2,037,596. In this case, the zeotype can be used as a catalyst in processes of selective oxidation of organic products using $H_2$ $O_2$ or hydroperoxides or organic peroxides as the oxidant. In this case, the chemical composition of the material in its anhydrous and roasted state can be represented by the formula $$x(HXO_2):yTiO_2:SiO_2$$

where X is a trivalent cation (Al, Ga, B, . . . ) and y can take values between 0 and 0.1.

DESCRIPTION OF THE INVENTION

The present invention relates to a new zeolitic material, denominated ITQ-5, and to a method for preparation thereof, characterised by the relatively low pH of the synthesis medium and the use of F anions as mineralising agent. The material in roasted form has the empirical formula $$x(HXO_2):TO_2$$

where T is one or several tetravalent elements, X is a trivalent element (Al, Ga, Fe, B, Cr, . . . ), and x has a value less than 0.5, this being able to be 0. Also claimed is the use of the materials obtained in catalytic processes of hydrocarbon and functionalised hydrocarbon transformation. When the material contains Ti, V or some other element with oxidative catalytic capacity (Ti-ITQ-5, V-ITQ-5, etc.) the material is also claimed in processes of selective oxidation of organic compounds using $H_2O_2$ or peroxides or organic hydroperoxides.

A more specific zeolitic material is one which has the empirical formula in the roasted and anhydrous form of:

$$x(HXO_2):gGeO_2:SiO_2$$

where the ratio Si/Ge is greater than 2, X is a trivalent cation as stated above and (Si+Ge)/X is greater than 5. A further specific material is one having the empirical formula in the roasted and anhydrous form of:

$$X(HXO_2):gGeO_2:tTiO_2:SiO_2$$

where the ratio of Si/Ge is greater than 2, X is a trivalent cation as stated above, the ratio (Si+Ge)/X is greater than 5 and the ratio (Si+Ge)/Ti is in the range 10 to 10,000. A final specific zeolitic material of this invention is represented by the empirical formula in the roasted and anhydrous form of:

$x(HXO_2):gGeO_2:tTO_2:SiO_2$ where the ratio Si/Ge is greater than 2, X is trivalent cation, the ratio (Si+Ge)/X is greater than 5, T is a tetravalent cation different from Si and Ge and the ratio (Si+Ge)/T is in the range 10 to 10,000.

The preparation method is based on heating a reaction mixture that contains a silicon source (amorphous silica, colloidal silica, silica gel, tetraalkylorthosilicate, etc., preferably amorphous silica or tetraethylorthosilicate), a source of germanium (germanium oxide, germanium alkoxide, . . . ), optionally a source of aluminium (aluminium oxide or hydroxide, another aluminium salt, aluminate of an organic cation or metallic aluminium, preferably metallic aluminium or aluminium hydroxide) or other trivalent elements (Cr, Ga, B, Fe, . . . ), optionally a source of Ti (titanium alkoxide or halide, preferably titanium tetraethoxide, tetrapropoxide or tetrabutoxide), V (such as vanadium sulphate for example) or another tetravalent element, an organic cation as a structure director (preferably tetraethylammonium), optionally $H_2O_2$, a source of F anions and water, avoiding the presence of alkali cations, to temperatures of 363–473 K, preferably to 403–423 K. The sources of F anions and of organic cations are chosen in such a way that the final pH, after crystallisation, lies in the range 6 to 12, preferably in the range 8–9.5. The composition of the synthesis mixture is characterised by the following molar ratios:

$H_2O/(SiO_2+GeO_2)$=4–50, preferably 4–20, more preferably 4–8

$(SiO_2+GeO_2)/X_2O_3$=10–8, preferably greater than 14

$TEA/(SiO_2+GeO_2)$=0.125–0.80, preferably 0.15–0.72

$HF/(SiO_2+GeO_2)$=0.1–2, preferably 0.1–0.8

$(SiO_2+GeO_2)/T'O_2$=4–8, preferably 20–8

$H_2O_2/T'O_2$=0–50, preferably 0–20 where T' represents a tetravalent element other than Si and Ge (Ti, V, . . . ) and X is a trivalent element (Al, B, Ga, Cr, Fe, . . . ).

With a view the favouring crystallisation it may be convenient to seed the mixture with crystals of zeolite ITQ-5. These crystals can be added as dry solid, as a suspension of the crystals in a suitable liquid or as a pre-organised gel.

In contrast to other synthesis methods, that require centrifugation to separate the zeolite, the method object of the present invention allows the zeolite to be separated from the initial liquid by filtration. As a result of this filtration materials are obtained which are highly crystalline and that can be roasted to eliminate the occluded organic material. A suitable roasting method consists of heating under vacuum, a $N_2$ or another inert gas atmosphere, to temperatures greater than 400° C., preferably greater than 550° C.

The solid product obtained has a characteristic X-ray diffraction pattern (Cu $K_\alpha$ radiation, FIG. 1). This pattern has similar features to the pattern for Beta zeolite (U.S. Pat. No. 28,341) at high angles 2Θ (>20°), where Θ is the Bragg angle, but shows little similarity at low angles. In particular, the peak at 2Θ angles around 7.7°, characterised by a full width half maximum of around 1° and characteristic of the Beta zeolite (Newsam, J. M., Treacy, M. M. L., Koetsier, W. T., de Gruyter, C. B, . . , *Proc. R. Soc. Land A*, 1988, 420, 375) does not appear in the ITQ-5 pattern. Instead there are two peaks at 7 and 9.6°, 2Θ, which in general show a lower full width half maximum (0.5 and 0.7° respectively). Furthermore, at times, another set of much finer peaks appears (depending on the synthesis and roasting conditions). A typical X-ray diffraction pattern for ITQ-5 is shown in the following Table. It was obtained using an automatic divergence slit, working in constant irradiation mode, and using $K_\alpha$ from Cu.

TABLE 1

| X-ray diffraction patter of zeolite ITQ-5 | |
|---|---|
| 3.4050 | 13 |
| 4.8000 | 2 |
| 5.8650 | 3 |
| 6.7800 | 18 |
| 7.0100 | 26 |
| 8.2900 | 5 |
| 9.5750 | 27 |
| 10.1550 | 11 |
| 11.1900 | 2 |
| 11.7300 | 10 |
| 12.2050 | 2 |
| 12.6450 | 1 |
| 13.2950 | 3 |
| 13.5450 | 2 |
| 13.9650 | 5 |
| 14.3650 | 2 |
| 18.2550 | 6 |
| 19.3650 | 9 |
| 19.8000 | 7 |
| 20.3650 | 16 |
| 21.0350 | 17 |
| 21.7350 | 19 |
| 22.1200 | 100 |
| 23.1000 | 8 |
| 23.8100 | 7 |
| 25.0150 | 18 |
| 25.6900 | 8 |
| 26.1550 | 7 |
| 26.7500 | 29 |
| 28.0900 | 19 |
| 28.3050 | 22 |
| 29.2000 | 33 |
| 30.0250 | 15 |
| 30.7250 | 9 |
| 31.4750 | 7 |
| 32.4300 | 12 |
| 32.9100 | 12 |
| 33.8900 | 6 |
| 34.4150 | 13 |
| 35.9800 | 14 |
| 37.8650 | 7 |
| 38.5350 | 7 |
| 39.1150 | 8 |
| 39.9500 | 8 |
| 40.5750 | 7 |
| 41.4800 | 8 |
| 42.8500 | 13 |
| 43.8350 | 7 |
| 44.4000 | 7 |
| 45.0000 | 7 |
| 46.2050 | 9 |
| 47.1850 | 8 |
| 47.7350 | 8 |
| 48.6450 | 8 |
| 49.4900 | 12 |

After roasting under vacuum, ITQ-5 shows the following characteristic lines

TABLE 2

| | |
|---|---|
| 3.3500 | 13 |
| 4.7200 | 3 |
| 6.9000 | 42 |
| 9.4900 | 35 |
| 11.6500 | 6 |
| 13.2100 | 8 |
| 13.8500 | 5 |
| 15.3500 | 5 |
| 18.2050 | 5 |
| 19.2850 | 10 |
| 20.2750 | 11 |

TABLE 2-continued

| | |
|---|---|
| 20.8700 | 16 |
| 21.9650 | 100 |
| 23.0650 | 10 |
| 24.8750 | 16 |
| 25.6250 | 8 |
| 26.7050 | 22 |
| 27.9650 | 19 |
| 29.1850 | 25 |
| 30.0100 | 12 |
| 32.7900 | 12 |
| 34.2350 | 12 |

Considering the chemical composition of the zeolite obtained, the method of the present invention allows the synthesis of zeolite Ge-ITQ-5, Ti-ITQ-5, V-ITQ-5, etc., with a T/Al molar ratio varying within the range 5–8, where T is the set of tetravalent atoms.

The applications of the material obtained by the present method and which are claimed in the present specification are:

in the preparation of zeolitic membranes on supports as anadditive to catalysts for catalytic cracking active or additive component in light petrol isomerisation catalysts as a hydrocracking catalyst as a gentle hydrocracking catalyst as a de-paraffining and isode-paraffining catalyst as a catalyst of alkylation of isoparaffins with olefins and alkylation of aromatics with olefins and alcohols and more specifically the production of cumene by alkylation of benzene with propylene.

as a catalyst of selective oxidation of organic compounds using $H_2O_2$ or peroxides or organic hydroperoxides; oxidation of alkanes to alcohols and ketones; oxidation of alcohols to ketones; hydroxylation of aromatics; epoxydation of olefins; oxidation of thioethers to sulphoxides and sulphones; amoxymation of cyclohexanone to cyclohexanonaoxime with $NH_3$; etc.

EXAMPLES

Example 1

This example illustrates the preparation of ITQ-5 containing Si and Ge.

Figure 1:
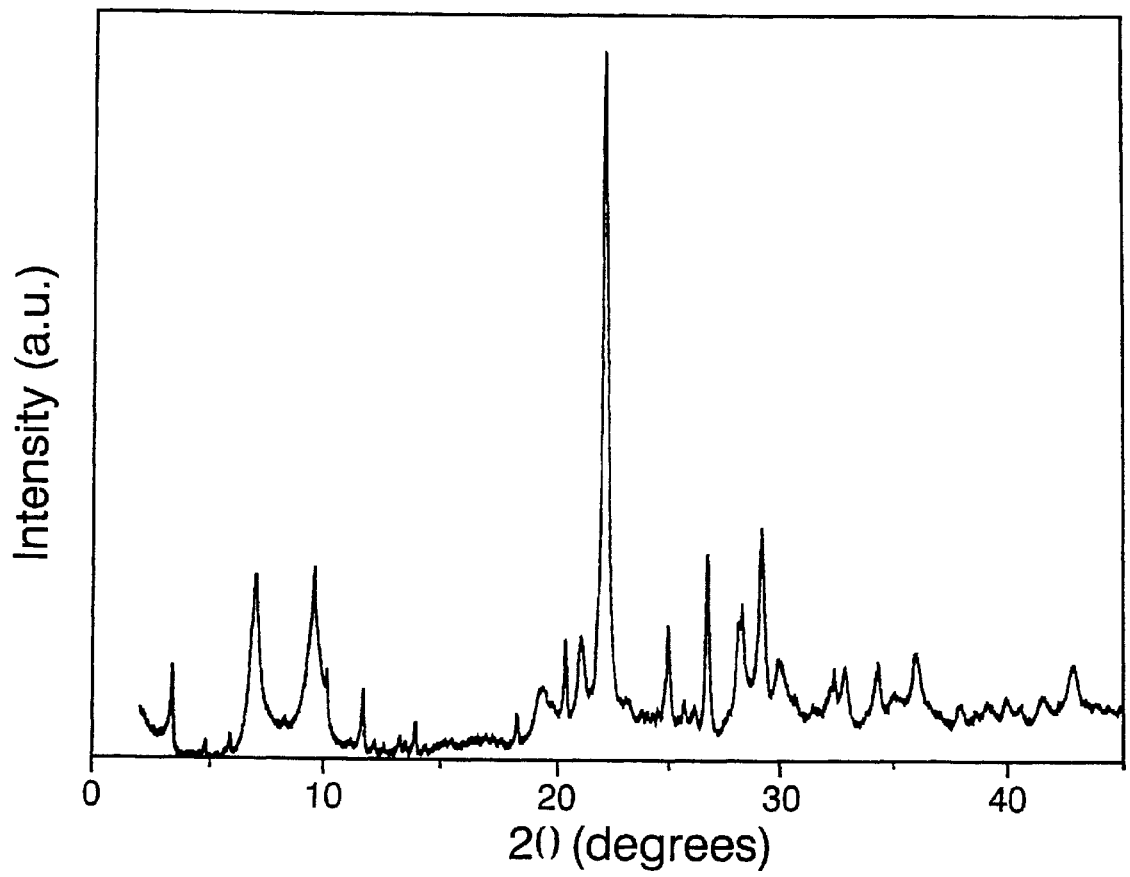
FIG. 1 is the X-ray diffraction pattern of the as-synthesized ITQ-5 formed in Example 1.

15 g of tetraehtylorthosilicate (TEOS) is hydrolysed in 24.54 g of tetraethylammmonium hydroxide (TEAOH, 35% aqueous solution) and 3.49 g of water. Then 3.77 g of $GeO_2$ are added until completely dissolved. The mixture is left while shaking, evaporating off the ethanol formed by hydrolysis of TEOS. 2.51 g of HF (48% aqueous) are now added and the resulting mixture heating too 140° C. in autoclaves lined with PTFE. During the heating the autoclaves are kept rotating (60 rpm). After 67 hours of heating the mixture is filtered (pH=8.0) and 19.73 g of zeolite ITQ-5 are obtained for every 100 g of seed gel. The X-ray diffraction pattern is shown in FIG. 1.

Example 2

This example illustrates the roasting of ITQ-5 to give a micro-porous solid.

Figure 2:
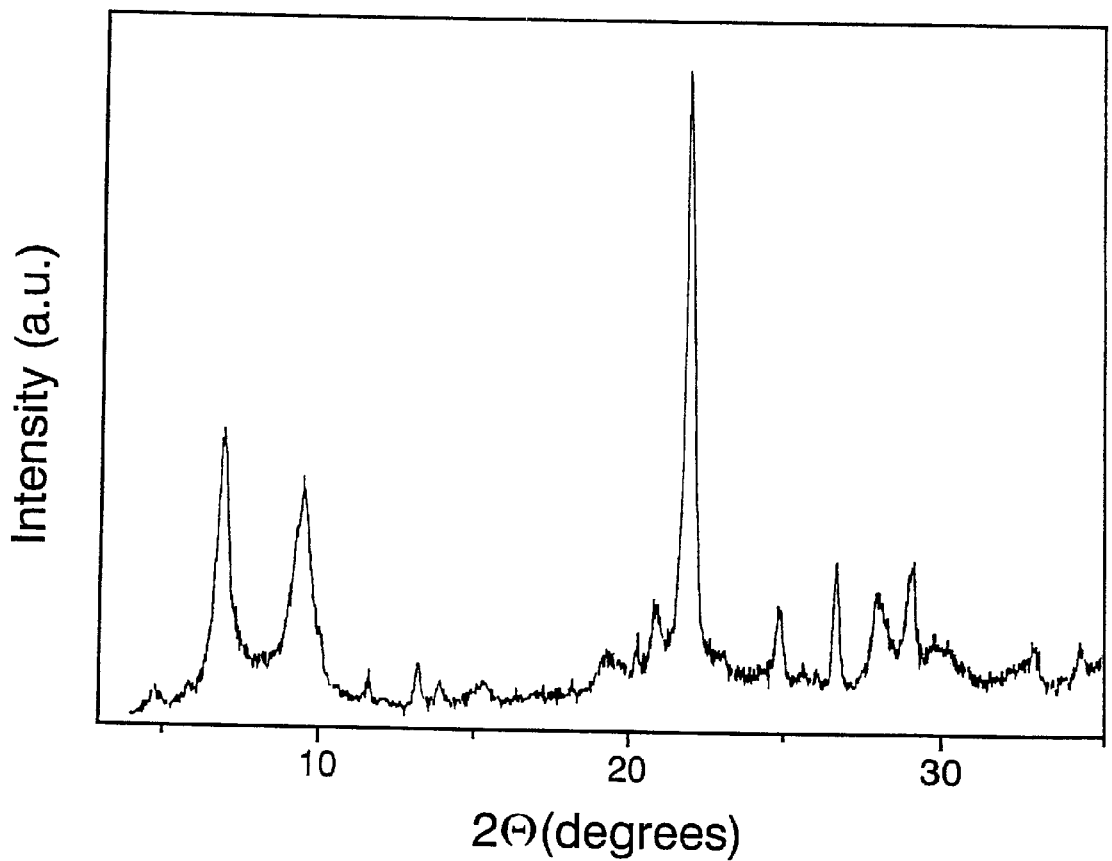
FIG. 2 is the X-ray diffraction pattern of the calcined ITQ-5 formed in Example 2.

Part of the solid obtained from the previous example is roasted under vacuum at 580° C. for 3 hours. The X-ray diffraction pattern of the solid obtained is shown in FIG. 2 and in Table 2. The adsorption of $N_2$ at 77 K indicates that, after roasting, ITQ-5 is a micro-porous solid with a micropore volume of 0.2 cc/g.

Example 3

This example, which is included here to allow comparison between the ITQ-5 and Beta materials, illustrates the preparation of a Beta zeolite in accordance with our patent application P9600625.

Figure 3:
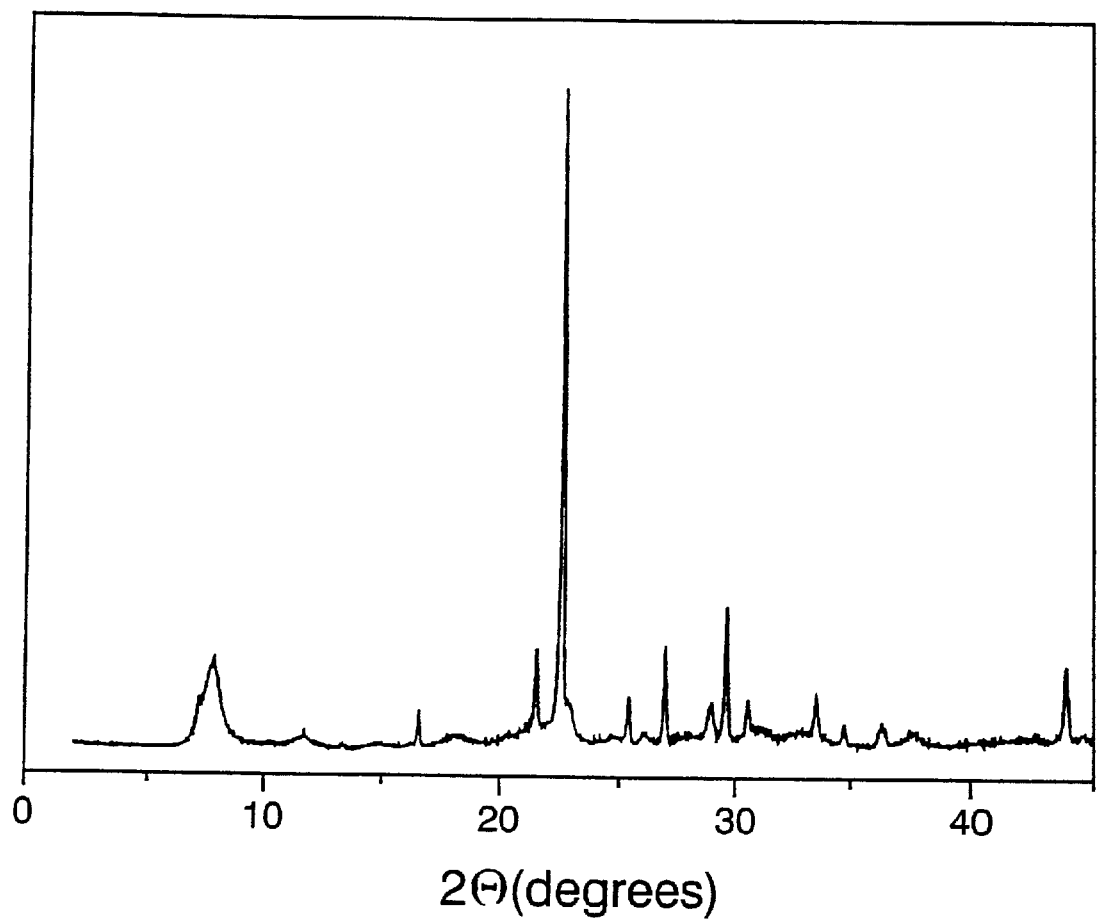
FIG. 3 is the X-ray diffraction pattern of as-synthesized zeolite beta formed in Example 3.

80.55 g of tetraethylammonium hydroxide (35% aqueous solution by weight, Aldrich, Na<2 ppm, K<0.5 ppm) and 11.45 g of de-ionised water are mixed. 73.82 g of tetraethylorthosilicate are then added to the resulting solution. The mixture is kept at room temperature with shaking to evaporate the ethanol produced. 7.97 g of HF (48%) are then added to the solution formed. The resulting mixture is heated to 140° C. in autoclaves lined with PTFE. During the heating the autoclaves are kept rotating (60 rpm). After 39 hours of heating the mixture is filtered (pH=8.8) and 25.1 g of Beta zeolite are obtained for every 100 g of seed gel. The X-ray diffraction pattern is shown in FIG. 3. The characteristic differences between the pattern obtained from the Beta material and that obtained from ITQ-5 pattern can be readily observed.

What is claimed is:

1. A micro-porous zeolite material with an x-ray diffraction pattern coinciding with patterns shown in Tables 1 and 2 in the as-synthesized and calcined form, respectively.

2. A material according to claim 1 whose composition, in the roasted and anhydrous state corresponds to the empirical formula:

$x(HXO_2):TO_2$ where T is at least one tetravalent element selected from the group consisting of Si, Ge, Ti, and V, X is a trivalent element selected from the group consisting of Al, Ga, Fe, B, and Cr, and x has a value from 0 to 0.5.

3. A material according to claim 1 or 2 in which the empirical formula of the roasted and anhydrous material is

$x(HXO_2):gGeO_2:SiO_2$ where the ratio Si/Ge is greater than 2, X is a trivalent cation and the ratio (Si+Ge)/X is greater than 5.

4. A material according to claim 1 or 2 in which the empirical formula of the roasted and anhydrous material is

$x(HXO_2):gGeO_2:tTiO_2:SiO_2$ where the ratio Si/Ge is greater than 2, X is a trivalent cation, the ratio (Si+Ge)/X is greater than 5 and the ratio (Si+Ge)/Ti is in the range 10 to 10000.

5. A material according to claim 1 in which the empirical formula of the roasted and anhydrous material is

$x(HXO_2):gGeO_2:tTO_2:SiO_2$ where the ratio Si/Ge is greater than 2, X is a trivalent cation, the ratio (Si+Ge)/X is greater than 5, T is a tetravalent cation different from Si and Ge and the ratio (Si+Ge)/T is in the range 10 to 10000.

6. A method for synthesizing the microporous zeolite material of any of claims 1, 2 or 3 comprising forming a reaction mixture having a composition, in terms of molar ratios of:

$H_2O/(SiO_2+GeO_2) = 4-50$.
$(SiO_2+GeO_2)/X_2O_3 = 10-8$,
$TEA/(SiO_2+GeO_2) = 0.125-0.80$,
$HF/(SiO_2+GeO_2) = 0.1-2$, and reacting the mixture at crystallization conditions to provide the material and characterized in that the pH of the mixture after crystallization has a value of 6 to 12.

7. A method according to claim 6, wherein the molar ratio $H_2O/(SiO_2+GeO_2)$ is 4–20.

8. A method according to claim 6, wherein the molar ratio $H_2O/(SiO_2+GeO_2)$ is 4–8.

9. A method according to claim 6, wherein the molar ratio $TEA/(SiO_2+GeO_2)$ is 0.15–0.72.

10. A method according to claim 6, where in the molar ratio $HF/(SiO_2+GeO_2)$ is 0.1–0.8.

11. A method according to claim 6, wherein the pH after crystallization is 8–9.5.

12. A method for preparing a microporous zeolite material according to any of claims 1, 2, 4 or 5, containing Ti, Cr, or V and having an X-ray diffraction pattern coinciding to that shown in FIG. 1 comprising forming a reaction mixture having a composition, in terms of molar ratios of:

$H_2O/(SiO_2+GeO_2)=4-50$.
$(SiO_2+GeO_2)/X_2O_3=100-8$,
$TEA^+/(SiO_2+GeO_2)=0.125-0.80$,
$HF/(SiO_2+GeO_2)=0.1-2$, and reacting the mixture at crystallization conditions to provide the material and characterized in that the pH of the mixture after crystallizatior has a value of 6 to 12.

13. A method according to claim 12, wherein the molar ratio $H_2O/(SiO_2+GeO_2)$ is 4–20.

14. A method according to claim 12, wherein the molar ratio $H_2O/(SiO_2+GeO_2)$ is 4–8.

15. A method according to claim 12, wherein the molar ratio $(SiO+GeO_2/X_2O_3$ is 10–8.

16. A method according to claim 12, wherein the molar ratio $TEA^+/(SiO_2+GeO_2)$ is 0.15–72.

17. A method according to claim 12, wherein the molar ratio $HF/(SiO_2+GeO_2)$ is 0.1–08.

18. A method according to claim 12, wherein the molar ratio $H_2O_2/TO_2$ is 0–20.

19. A method according to claim 12, wherein the pH, after crystallisation, is 8–9.5.

20. A hydrocarbon conversion process comprising contacting the microporous zeolitic material of any of claims 1 to 5 with a hydrocarbon feed to provide a converted hydrocarbon and where the process is selected from the group consisting of cracking, hydrocracking, gentle hydrocracking, hydroisomerization, de-paraffining, isodeparaffining, alkylation of isoparaffins, and alkylation of aromatics.

21. A process for the selective oxidation of organic compounds comprising contacting the organic compounds with the zeolitic material of any of claims 2, 4 or 5 and $H_2O_2$, peroxides or organic hydroperoxides to provide oxidized compounds.

* * * * *